March 17, 1942.  G. RILEY  2,276,593

ENGINE

Filed June 4, 1940

Inventor

George Riley

By Maréchal & Noë

Attorney

Patented Mar. 17, 1942

2,276,593

UNITED STATES PATENT OFFICE 2,276,593

ENGINE

George Riley, Los Angeles, Calif.

Application June 4, 1940, Serial No. 338,778

8 Claims. (Cl. 123—65)

This invention relates to sleeve valve engines more especially for 2-stroke cycle operation.

One object is the provision of an engine having a port-controlling sleeve valve which is slidably movable with respect to a piston and a cylinder wall, and adapted for yielding radial expansion and contraction to maintain a desired fit under different temperature conditions.

Another object is the provision of an internal combustion engine embodying a reciprocably operable sleeve valve and a piston operable in timed relation in a cylinder having ports controlled by the sleeve valve, with the outer end of the sleeve valve exposed in the combustion chamber, the construction being such as to facilitate the transfer of heat from the sleeve valve to the cylinder wall.

Another object is the provision of an internal combustion engine having a port-controlling sleeve valve provided with means permitting radial expansion and contraction to maintain a desired fit with the cylinder in which the valve is operable, the valve being provided with means for maintaining a desired expansion force so that a positive fit with the cylinder wall will be obtained regardless of temperature conditions.

Other objects and advantages of the invention will be apparent from the following description, the appended claims, and the accompanying drawing.

Figure 1:
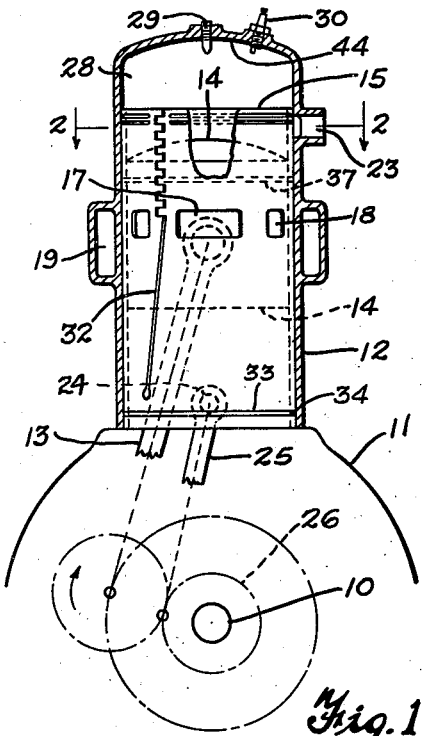
Fig. 1 is a central vertical section of a portion of an engine embodying the present invention.

The drawing shows the preferred embodiment of the invention in connection with an engine construction of the internal combustion type, although the engine could be a compressor or the like, driven from a suitable source of power. The engine may, of course, have any suitable number of cylinders. Referring more particularly to the drawing, in which the same reference numerals have been applied to like parts in the several views, Fig. 1 shows a two-cycle internal combustion engine, having a crankshaft 10 rotatably supported in any suitable manner in the engine crankcase 11 which carries the cylinder 12. The crankshaft has a crank connection through the piston rod 13 to the piston 14 which is reciprocably operable in a sleeve valve 15. The sleeve 15 is adapted for sliding movement in the cylinder and is so arranged as to control ports arranged in the cylinder wall. In the form of engine construction shown, the sleeve valve has port-controlling openings 17 at opposite sides thereof and additional openings 18 which function with the ports 17 to control the supply of air or mixture to the cylinder from the supply chamber 19 which extends around the cylinder wall. Ports 21 in the cylinder wall provide communication from the supply chamber 19 to the combustion chamber when the port controlling openings 17 and 18, and the piston 14, are at predetermined locations in the cylinder. The outer end of the sleeve valve 15 is adapted to control the openings and closing of an exhaust passage 23.

The lower end of the sleeve valve, at one side of the valve axis, has a boss 24 which is received in a hole at the upper end of an eccentric rod 25, driven from an eccentric 26 on the crank shaft 10 in timed relation with the piston movements. The timing of the valve and the piston is preferably such that after an explosion takes place in the combustion chamber 28 both the piston and the sleeve valve descend in the cylinder, the piston moving more rapidly than the sleeve valve, until the upper end of the sleeve valve uncovers the exhaust port 23 so that the burnt gases can escape. This preferably takes place when the piston has completed a little more than half its stroke. The continued movement of the piston and the sleeve valve then bring these parts into such relation as to open the inlet ports in the cylinder and permit a flow of scavenging air, under suitable pressure, into the cylinder. During the outward or compression stroke of the piston, the exhaust port is covered by the sleeve valve while the inlet ports are open to permit free flow to the combustion chamber. Before the inlet ports are closed by the piston and the sleeve valve, the combustion chamber will be therefore charged with air before the inlet valves are fully closed. Air compression then takes place in the combustion chamber, fuel is supplied or injected through the fuel injection nozzle 29 and ignited at the proper time in the sequence of operations as by a spark plug 30.

The sleeve valve, in accordance with the present invention, is so arranged as to provide a maintained sliding fit with the cylinder wall, the valve having a longitudinal split or slot which permits radial expansion and contraction and affords a yieldingly positive contact with the cylinder wall so that no substantial or deleterious leakage between the valve and the cylinder wall is permitted. The valve construction also affords an effective surface engagement through a thin oil film, between the valve and the cylinder wall, for the efficient conduction of heat from the valve to the cylinder.

Figure 3:
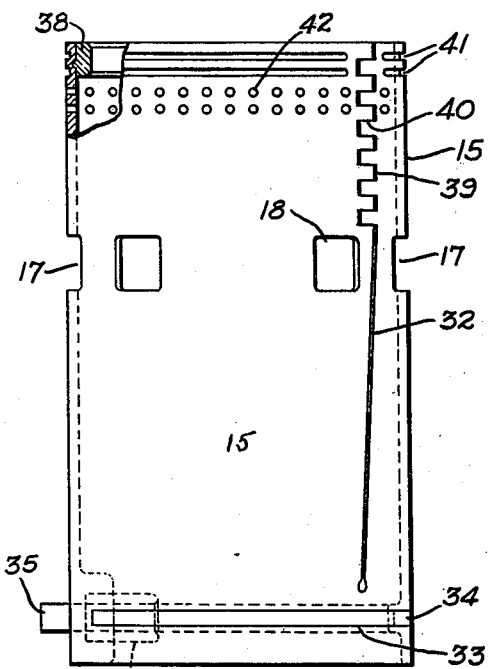
Fig. 3 is an enlarged side view of the sleeve valve.

As will be apparent from Fig. 3, the valve comprises an annular sleeve of cast iron or other suitable material, having a slot 32 extending generally in a longitudinal direction from the outer end of the sleeve and preferably at a slight inclination to a line exactly parallel to the sleeve axis so that different portions of the cylinder wall will be engaged by the parts of the valve immediately adjacent the slot. The slot 32 extends between a pair of adjacent port-controlling openings in the sleeve and preferably terminates at some distance from the lower end of the sleeve so that the lower end will extend annularly throughout the complete circumferential extent of the sleeve. Near its lower end the sleeve preferably has an annular groove 33 which receives an interfitting lock ring segment 34, the latter rigidifying the lower end of the sleeve against any longitudinal twisting tendency which might be present if the slot 32 extends to a point quite close to, or all the way to, the bottom of the sleeve. The ring 34 is firmly engaged along its upper and lower surfaces with the sides of the groove 33, and both the groove and the ring extend only partway around the periphery of the sleeve, so that the ring is prevented from turning. As shown, the groove and the ring terminate adjacent the location of the boss 24 and adjacent the location of an outwardly projecting pin or slide block 35 which is guided in a groove extending longitudinally along the cylinder wall to keep the sleeve from rotating during its reciprocatory movement.

The slot 32 serves to separate the adjacent portions of the sleeve a suitable distance, in normal operation, the outer diameter of the sleeve being such that the slot will be partially closed as the sleeve operates along the cylinder wall and providing a yielding contact throughout the entire annular extent of the sleeve, in the cylinder. The outside of the sleeve will thus have a positive sliding contact throughout the major portion of its length and substantially throughout its complete annular extent, thus providing a very effective heat transmitting relation between the sleeve and the cylinder wall and preventing the leakage of gas along the outer side of the sleeve. The inherent expanding action of the sleeve will also be augmented by the pressure exerted on the sleeve by the piston rings 37 of the piston. An additional split expanding ring 38 may also be provided in direct engagement with and carried by the outer end of the sleeve as shown in Fig. 3.

The outer end of the slot 32 has a dovetail or interfitting formation as shown at 39, to prevent any substantial direct flow lengthwise of the slot from the combustion chamber, the laterally extending surfaces 40 or the adjacent portions of the sleeve wall at opposite sides of the slot overlapping one another being arranged parallel to one another to permit free expansion and contraction while maintaining the outer end of the slot substantially closed against the longitudinal passage of gases.

The outer end of the sleeve is preferably provided with one or more small annular grooves 41 in which oil will be retained, and terminating a little distance from the slot, and is also provided with a series of radially extending holes or perforations 42 of suitable number and size to reduce the outward expansion force of the upper end of the sleeve against the cylinder at the time of combustion. The outer end of the sleeve extends into the combustion chamber, being freely exposed in the chamber and constituting a part of the chamber at the time the fuel is ignited, as it is unnecessary to shield the outer end of the sleeve by means of the junk ring head construction often used in sleeve valve engines. The inner surface 44 of the cylinder head is therefore arranged outwardly of the outer end of travel of the sleeve valve, as will be apparent from Fig. 1.

As will be apparent the engine is of very simple construction of comparatively small size for any given power requirement, and operates efficiently without substantial loss or leakage past the valve, and with an effective valve cooling action.

Figure 4:
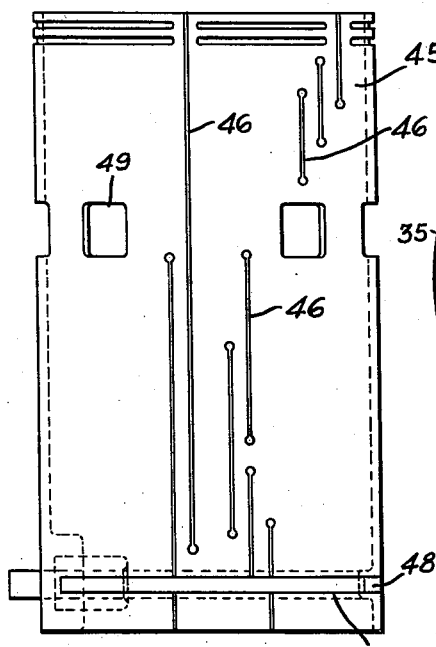
Fig. 4 is a side view of a sleeve valve of somewhat modified construction.
Figure 2:
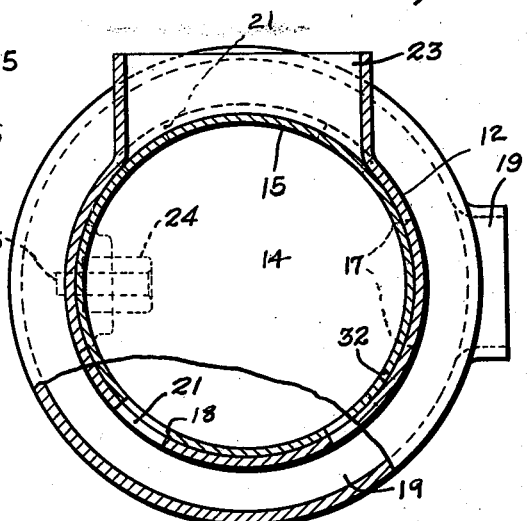
Fig. 2 is a horizontal section on the line 2—2 of Fig. 1.

In accordance with the modification shown in Fig. 4, the sleeve valve 45 instead of being longitudinally split at only one point along its periphery, is provided with a series of slots 46 which terminate at different points along the length of the valve, some of the slots extending from the lower end of the sleeve and others from the upper end so that the lower end as well as the upper end and middle portion of the sleeve is radially expansible. The lower end of the sleeve has an annular groove 47 receiving the lock ring segment 48 which extends past the slots and holds adjacent portions of the sleeve wall against relative longitudinal distortion or displacement. The sleeve valve 45 is provided with openings 49 and is otherwise similar in construction to the sleeve valve 15.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In an engine, a cylinder having ports, a piston and a sleeve valve arranged one within another in coaxial relationship, said sleeve valve having ports adapted to register with the ports of the cylinder, means for axially moving the sleeve and the piston with respect to the cylinder in timed relation, said sleeve having a substantially longitudinally extending slot providing for radial expansion and contraction regardless of valve temperature and having a portion forming part of the combustion chamber of the engine between the ports in the sleeve valve and the outer end of the sleeve valve, such portion having a series of substantially radially extending holes through which combustion pressures are transmitted directly to the cylinder to control the pressure of the sleeve valve with respect to the cylinder.

2. In an engine, a cylinder, a piston and a sleeve valve arranged one within another in coaxial relationship, means for axially moving the sleeve and the piston with respect to the cylinder in timed relation, said sleeve having ports and having means providing for radial expansion and contraction regardless of valve temperature and having a series of holes extending substantially radially through a portion of the sleeve subjected to combustion pressures, and an expansible ring within the sleeve at the end thereof exerting a yielding expansive force on the sleeve to maintain it in positive contact with the cylinder wall.

3. In an engine, a cylinder having a port, a sleeve slidably carried within the cylinder and having a portion controlling said port, a piston operable in the sleeve, means for operating the piston and sleeve axially in timed relation, said sleeve having means circumferentially displaced from a port-controlling portion and providing for radial expansion and contraction to maintain a positive sliding fit with the cylinder wall and having a portion forming part of the combustion chamber and spaced axially from the port controlling portion of the sleeve and provided with a series of holes through which combustion pressures are transmitted directly to the cylinder to control the pressure of the sleeve with respect to the cylinder.

4. In an internal combustion engine, a cyinder having ports, a sleeve slidably carried in the cylinder for axial movement and having a number of axially facing portions controlling flow through said ports, and arranged some at the end of the sleeve and some at a location remote from the end, the outer end of the sleeve extending into the combustion chamber, a piston operable in said sleeve, and means for operating the piston and sleeve in timed relation, said sleeve having a split circumferentially displaced from all of said flow-controlling portions providing for radial expansion and contraction, the portion of the sleeve between the end flow controlling portions and the remote flow controlling portions having a series of holes through which combustion pressures are transmitted to the cylinder to control the pressure of the sleeve with respect to the cylinder.

5. An internal combustion engine comprising a cylinder having intake and exhaust ports, a sleeve slidably arranged in said cylinder and having portions controlling flow through said ports said sleeve having a substantially longitudinally extending slot extending from one end of the sleeve to a point displaced from the other end and providing for yielding radial expansion and contraction, a piston operable in said sleeve, one end of the sleeve being exposed in the combustion chamber and having a series of substantially radially extending holes through which the combustion pressures are transmitted directly to the cylinder, and means for operating the sleeve and piston in timed relation.

6. An internal combustion engine comprising a cylinder having intake and exhaust ports, a sleeve slidably arranged in said cylinder and having an end portion and ports respectively controlling flow through said intake and exhaust ports, said sleeve having means providing for yielding radial expansion and contraction, a piston operable in said sleeve, means within the sleeve for maintaining an expanding pressure thereon, one end of the sleeve between its end portion and its ports being exposed in the combustion chamber and having holes through which combustion pressures are transmitted to the cylinder to control the pressure of the sleeve with respect to the cylinder, and means for operating the sleeve and piston axially in timed relation.

7. A two-cycle internal combustion engine of the character described comprising a cylinder having inlet and outlet ports, a sleeve axially slidable in the cylinder and having spaced portions controlling flow through said ports, the outer end of the sleeve extending into the combustion chamber, a piston operable in said sleeve, and means for operating the piston and sleeve in timed relation, said sleeve having a split in the outer end thereof terminating short of the inner end of the sleeve and located circumferentially displaced from any of the flow-controlling portions of the sleeve, providing for radial expansion and contraction of the sleeve to maintain it in positive contact with the cylinder, the sleeve where it extends into the combustion chamber and between the spaced flow controlling portions thereof having a series of substantially radially extending holes for transmitting combustion pressure directly to the cylinder to control the pressure of the sleeve with respect to the cylinder.

8. An engine valve adapted for sliding movement in the cylinder of an internal combustion engine said valve comprising a hollow cylindrical sleeve having port-controlling portions and having a substantially longitudinally split portion providing for radial expansion and contraction regardless of valve temperature, one end of the sleeve adapted for operation in the combustion chamber of the cylinder in contact with the cylinder wall and having a large number of substantially radial small perforations for transmitting combustion pressures to the cylinder and thus control the pressure of the sleeve with respect to the cylinder.

GEORGE RILEY.